United States Patent [19]
Sindoni

[11] Patent Number: 5,950,874
[45] Date of Patent: Sep. 14, 1999

[54] BATCHING MACHINE, IN PARTICULAR FOR DYES

[75] Inventor: Giuseppe Sindoni, Milan, Italy

[73] Assignee: Italtinto S.R.L., Carasco, Italy

[21] Appl. No.: 08/795,975

[22] Filed: Feb. 5, 1997

[30] Foreign Application Priority Data

Feb. 9, 1996 [IT] Italy .................................. MI960105 U

[51] Int. Cl.$^6$ .................................................. G01F 11/16
[52] U.S. Cl. ........................ 222/144.5; 222/132; 222/325; 141/104
[58] Field of Search ................................ 222/132, 144.5, 222/325; 141/104

[56] References Cited

U.S. PATENT DOCUMENTS

| | | | |
|---|---|---|---|
| 2,771,914 | 11/1956 | Pinney ...................................... | 141/104 |
| 2,923,438 | 2/1960 | Logan et al. .............................. | 222/132 |
| 2,995,158 | 8/1961 | Oberg ....................................... | 141/104 |
| 3,125,251 | 3/1964 | Poitras .................................. | 222/144.5 |
| 4,553,573 | 11/1985 | McGarrah ............................. | 222/144.5 |
| 4,967,938 | 11/1990 | Hellenberg .............................. | 141/104 |
| 4,986,448 | 1/1991 | Takahashi et al. ....................... | 222/325 |
| 5,033,651 | 7/1991 | Whigham et al. ....................... | 222/132 |
| 5,320,252 | 6/1994 | Fleming .................................. | 222/325 |
| 5,445,195 | 8/1995 | Kim ........................................ | 141/104 |

*Primary Examiner*—J. Casimer Jacyna
*Attorney, Agent, or Firm*—Notaro & Michalos P.C.

[57] ABSTRACT

A dye batching machine which allows the dyes to be dispensed simultaneously within a limited diameter so that containers with a small opening can be employed with a large number of supply canisters.

7 Claims, 2 Drawing Sheets

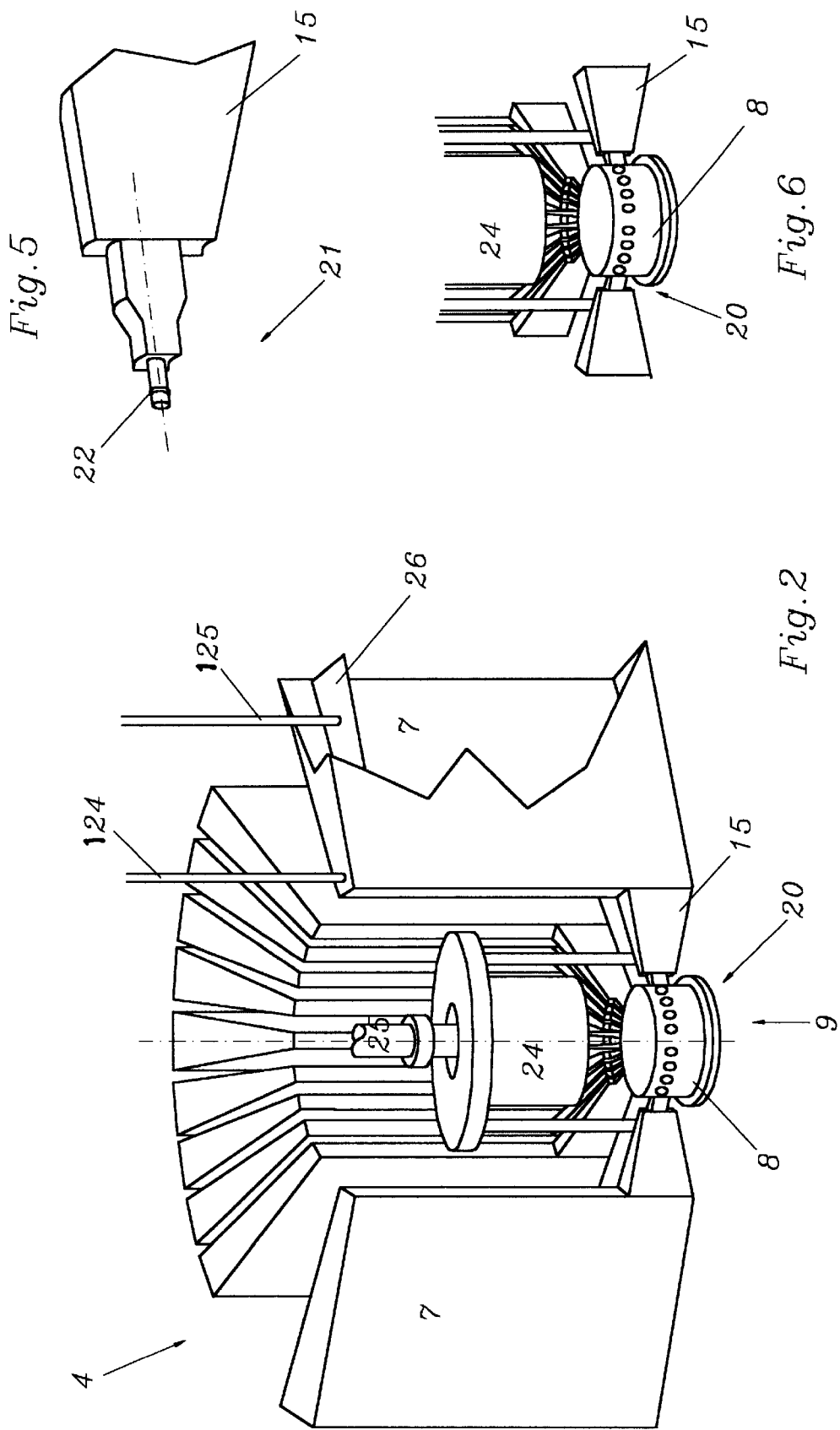

BATCHING MACHINE, IN PARTICULAR FOR DYES

FIELD AND BACKGROUND OF THE INVENTION

This invention relates to a batching machine for dyes or pigments in the liquid state. These machines are already known as a result of prior patents filed by the same applicant.

The said machines basically comprise an assembly consisting of a number of liquid pigment tanks or containers known as canisters, each of which is fitted with systems designed to mix the dye continuously inside the canister, a measuring device to regulate the amount of pigment dispensed, and a dispensing nozzle.

In view of the fact that these machines have to produce dyes of numerous different shades, it is necessary to have a relatively large number of basic colours and therefore canisters.

In order to limit the size of the machine, the said canisters are preferably wedge or crescent shaped, and are arranged radially around a dispensing area; the outlet nozzles of the canister are directed towards the dispensing area, and the receptacles to be filled are placed under it.

In particular, a first known technique involves directing the dispensing nozzles in a roughly vertical manner towards the dispensing area.

In batching machines so designed, the dispensing openings are situated along a circumference, and as their number is relatively large, the pigments are dispensed over a relatively large diameter.

For example, if there are 16 canisters, the dispensing openings are situated on a circumference with a diameter of at least 50 mm.

In view of these factors, the main drawback of this first known technique is obviously the fact that it is impossible to pour the pigments into collector jars or containers with a mouth of a smaller diameter than the one on which the dispensing openings are situated.

A second known technique involves connecting the outlets of each canister by means of a pipe or the like to a dispensing head comprising the same number of channels as the number of canisters, the said channels leading to outlet openings located on concentric circumferences.

This system considerably reduces the diameter of the pigment dispensing area.

For example, if there are 16 canisters, the dispensing diameter will be reduced to approx. 25 mm.

However, although this second known technique is popular because it allows even collector vessels with mouths of a small diameter to be employed with a large number of canisters, it still presents a number of drawbacks.

As there is very little free space, it is extremely difficult to connect the canister outlets to the dispensing head after the canisters have been fitted into their housings.

As a result, the canisters have to be connected to the dispensing head with hoses before being fitted in their final position.

The use of these hoses, which are much longer than theoretically necessary, causes considerable inconvenience.

When the dye remains motionless in the hoses, sedimentation takes place; in time the sediment tends to block the hoses, and therefore prejudice the normal operation of the machine.

The fact that the hoses have to be fixed to the canisters and the dispensing head also makes the fitting and removal of the canisters more laborious.

This is particularly inconvenient, and makes dismantling and reassembly of the machine very difficult and laborious, especially when the canisters are removed for maintenance operations.

SUMMARY OF THE INVENTION

The main purpose of this invention is to offer a dye batching machine which (i) eliminates these drawbacks, allowing the dyes to be dispensed simultaneously within a limited diameter so that containers with a small opening can be employed with a large number of canisters, (ii) is reliable in operation and (iii) does not require frequent maintenance.

One purpose of this invention is to offer a batching machine that enables canister fitting and removal operations to be performed quickly and easily.

Another purpose of this invention is to offer a batching machine that is easy and cheap to manufacture. This task, together with this and other purposes, is achieved by a batching machine for liquid dyes in which a number of canisters each have a radial coupling fitted on the side wall of a dispensing head, and an outlet is connected to the couplings via passages situated inside the dispensing head, which is mounted on a rear wall of the machine.

BRIEF DESCRIPTION OF THE DRAWINGS

Further advantages of the invention will become clear from the description of a preferred but not the only form of construction of the machine, which is illustrated by way of example but not of limitation in the annexed drawings, in which:

FIG. 2 is a schematic perspective view of a portion of the dispensing system of the machine forming the subject of the invention FIG. 5 is a perspective view of another detail of the invention; and FIG. 6 is an enlarged detail of the view shown in FIG. 2.

DESCRIPTION OF THE PREFERRED EMBODIMENTS

Figure 1:
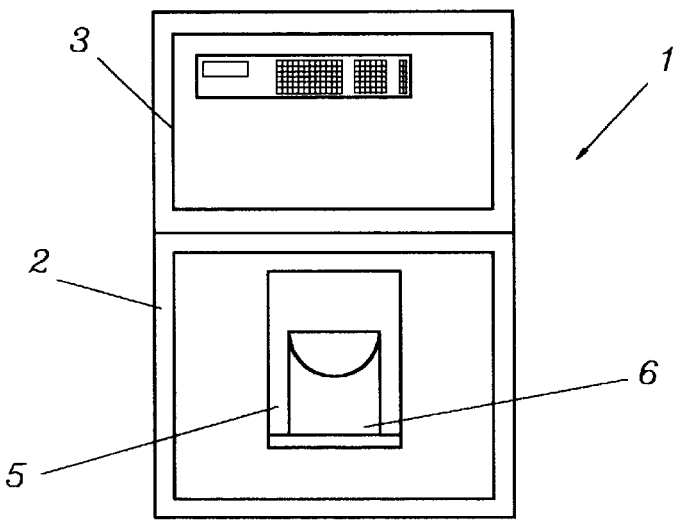
FIG. 1 is a schematic front elevation of a batching machine
Figure 3:
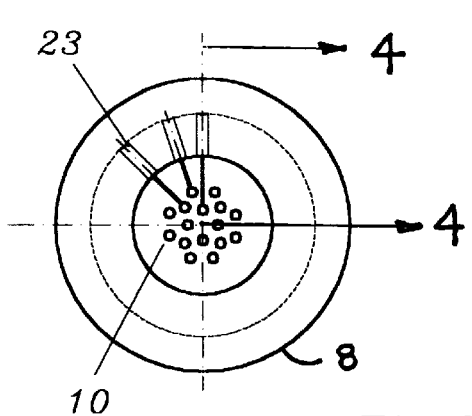
FIG. 3 is a bottom view of a detail of the invention

In the above figures the machine, which is indicated as a whole by the number 1, comprises a metal box structure 2 with a removable wall 3 to allow housing of a dispensing unit 4, and a cavity 5 below the said unit 4, designed to receive a container 6 into which the dye is poured.

Dispensing unit 4 comprises a number of roughly, wedge or crescent shaped dye tanks or canisters 7, arranged radially around a dispensing head 8, and known systems designed to regulate the outflow of dye from each canister 7.

In a preferred form of construction, the said known systems comprise a positive-displacement pump (not shown) to allow suction of the dye from canister 7 to a chamber 15 and expulsion from chamber 15 to dispensing head 8, and a solenoid valve (not shown) which opens and closes chamber 15 so that only the dyes required are dispensed.

Positive-displacement pumps are driven by rods 124 anchored to a mobile plate (not shown), which is driven with alternating motion by an electric motor 24 via a recirculating-ball nut 25.

Via second rods 125, the said mobile plate also controls blades 26 which maintain the pigment under agitation to prevent problems of sedimentation in canister 7.

Dispensing head 8 is roughly cylindrical, and has a number of outlet openings 10 on the bottom side 9 which are suitably arranged on a number of concentric diameters so as to minimise the size of head 8. The openings communicate with side surface 11 of head 8 via channels with an L-shaped trajectory 12.

A characteristic feature of the invention is that each canister 7 is connected to each channel 12 of head 8 not with connector hoses but with direct couplings 20; this system allows the connection between each canister 7 and the corresponding channel 12 to be activated or interrupted with no need for any particular operations, simply by inserting canister 7 in a radial direction.

Figure 4:
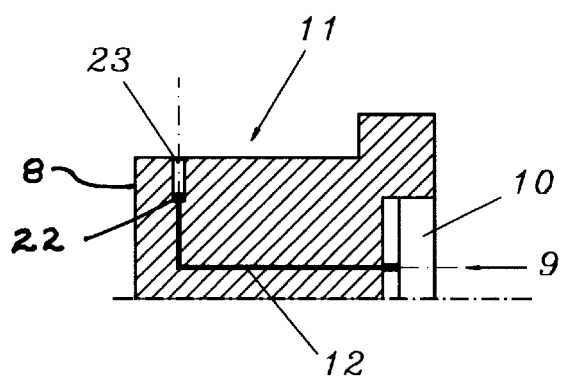
FIG. 4 is a cross-section taken along line 44—44, with the top of the dispensing head oriented to the left

In one form of construction illustrated, direct couplings 20 comprise male connectors 21 integral with canister 7 on which an O-ring 22 is fitted, and female connectors 23 arranged radially on the initial section of channels 12. Alternatively, as shown in FIG. 4, the O-ring 22 may be housed within female connector 23 of the dispensing head 8.

As a result of the invention, it will obviously be possible to connect canisters 7 to and disconnect them from dispensing head 8 with a simple radial movement, with no need to remove and refit the mobile plate above canister 7.

Normal maintenance operations are therefore much faster and easier.

Other forms of construction of Victaulic couplings 20 are obviously possible, all of which fall within the scope of the invention concept, and each part can be replaced with technically equivalent parts. For example, the direct couplings 20 could be activated using axial movement relative to the dispensing head 8.

In practice, any materials, shapes and dimensions can be employed, provided that they are compatible with the specifications and the uses described.

The reference numbers associated with the technical characteristics claimed are merely intended to aid comprehension of the claims, and therefore have no limiting effect on the scope of each part identified by such numbers.

What is claimed is:

1. A batching machine for dyes, the machine comprising:
    a machine housing;
    a central dispensing head having a top, at least one side wall and a bottom, the central dispensing head contained within the machine housing;
    a plurality of canisters each containing a substance for dispensing and an agitating blade, the canisters oriented radially surrounding the dispensing head;
    a plurality of chambers, one chamber connected to each canister at a first end of the chamber, each chamber containing a positive displacement pump means for suctioning the substance from the adjacent canister and expelling the substance into the dispensing head;
    an outlet in the bottom of the dispensing head;
    direct coupling means at least partly integral with the dispensing head for radially connecting a second end of each of the plurality of chambers through the at least one side wall of the dispensing head to the outlet;
    pump means for simultaneously dispensing the substance from at least two of the plurality of canisters through the outlet, the pump means comprising a motor positioned concentric above the central dispensing head, a plurality of first rods, each first rod connected to the positive displacement pump in one of the plurality of chambers, a plurality of second rods, each second rod connected to a corresponding one of the agitating blades in the plurality of canisters, each of the first and second rods being oscillated by the motor.

2. A batching machine according to claim 1, wherein the direct coupling means comprises a plurality of ducts through the dispensing head connecting each of the plurality of chambers to the outlet, and sealing means between each of the plurality of chambers and a corresponding one of the plurality of ducts for making a direct, sealed connection between each chamber and corresponding duct.

3. A batching machine according to claim 2, wherein the sealing means comprises a male connector on each chamber, a corresponding female connector in each duct and an O-ring secured to one of the male and female connectors.

4. A batching machine according to claim 3, wherein the O-ring is attached to the male connector.

5. A batching machine according to claim 2, wherein the ducts are "L" shaped between the at least one side and the bottom of the dispensing head.

6. A batching machine according to claim 1, wherein the direct coupling means is activated by radial movement of the plurality of canisters relative to the dispensing head.

7. A batching machine according to claim 1, wherein the direct coupling means is activated by axial movement of the plurality of canisters relative to the dispensing head.

* * * * *